United States Patent [19]

Studinger

[11] 4,345,734
[45] Aug. 24, 1982

[54] ADJUSTABLE BASE MOUNT FOR A WALKING-BEAM GAS COMPRESSOR

[76] Inventor: John Studinger, 1330 Leyden, Suite 134, Denver, Colo. 80220

[21] Appl. No.: 179,101

[22] Filed: Aug. 18, 1980

[51] Int. Cl.³ ............................................ F16M 11/00
[52] U.S. Cl. .................. 248/669; 248/354 R; 248/354 C; 248/411
[58] Field of Search ................ 248/297.2, 352, 354 C, 248/354 R, 411, 669

[56] References Cited

U.S. PATENT DOCUMENTS

| | | | |
|---|---|---|---|
| 1,832,938 | 11/1931 | Leach | 248/669 X |
| 3,398,933 | 8/1968 | Haroldson | 248/358 R |
| 4,010,926 | 3/1977 | Carnahan | 248/411 |
| 4,141,526 | 2/1979 | John | 248/352 |

FOREIGN PATENT DOCUMENTS

G 12080  10/1956  Fed. Rep. of Germany ... 248/354 C
1296338   5/1962  France ............................. 248/354 C Primary Examiner—William H. Schultz
Attorney, Agent, or Firm—Bruce G. Klaas

[57] ABSTRACT

Upright telescoping tubes having a base mount for bolting to well pumping platform and a top plate for attaching to a piston-type compressor has locking bolts between the inner tube and the outer tube for maintaining tube positions under high compressive stress. Reinforcing pressure plates, one on the outside of the outer tube and one on the inner tube provide large bearing surfaces forcing the two tubes together for accommodating high loads without slipping.

2 Claims, 5 Drawing Figures

ADJUSTABLE BASE MOUNT FOR A WALKING-BEAM GAS COMPRESSOR

The present invention relates to gas compressors for oil well pumps, and more particularly to gas compressor cylinders connected to the walking beams of oil well pumps. The invention is especially concerned with mounting a gas compressor cylinder on an oil well pump and to provide easy adjustments thereto whenever the rocking stroke of the walking beam is changed. As such, the invention may be called an adjustable base mount for a walking beam gas compressor, and will hereinafter be simply called a "base mount".

BACKGROUND OF THE INVENTION

A common oil well pumping system includes a reciprocating pump cylinder lowered into the well with a pump rod extended to the surface within tubing. The pumping unit at the surface includes the walking beam mounted upon horizontally-axised, transverse pivot at the top of a sampson post with one end being connected to the pump rod and the other end being connected to the crank of a drive motor through a connecting rod. Rotation of the crank cause the walking beam to rock or oscillate in a vertical plane to raise and lower the pump rod. The connection of the connecting rod to the crank is adjustable to change the rock of the walking beam of the pump. The rod-connected end of the walking beam is provided with the familiar "horse head" to keep the pump rod in alignment with the well axis. The opposite end of the walking beam carries a counterbalance weight to offset the weight of the pump rod and minimize the stress on the motor.

When pumping an oil well, both oil and gas may be produced and the capture of the gas is profitable. Where a high-pressure, high-volume gas flow exists, the gas can be added to a distribution system by a direct line connection or if the pressure is less than the distribution system pressure, a booster compressor can be used. On small volume gas wells, a compressor is used to lower casing head pressure to increase oil production.

Former oil production practice was to waste this gas as by flaring, but his is not always done today because of environmental considerations and the gas has become valuable. To capture and compress such small amounts of low-pressure gas, a simple cylinder-type gas compressor, hereinafter sometimes referred to as a "compressor cylinder", is mounted on the frame pumping unit with the piston rod thereof being connected to the walking beam. The rocking of the walking beam reciprocates the piston to effect intake and compression strokes. A gas intake line from the well head to the base of the cylinder, a discharge line from the cylinder to a distribution system line and suitable check valves in the intake and discharge lines complete the basic system.

The location and position of this compressor cylinder on the pumping unit must be carefully selected so as to produce the necessary gas pressure. The cylinder of the pumping unit and the connection point of its piston rod on the walking beam must be such as to place the cylinder in an upright position and normal to the walking beam when the beam is at an intermediate substantially-horizontal position. This location must also be such that the rocking movement of the walking beam at the connection point is less, and preferably only slightly less, than the maximum stroke of the piston within the cylinder. Finally, the position of the base of the cylinder on the pumping unit frame must be such that the piston moves closely to the bottom of the cylinder at the completion of the compression stroke to produce the rated gas pressure and to move all compressed gas out of the cylinder and into the discharge line. This is necessary to prevent wasted movement of the piston due to gas expansion, especially where the gas pressure during the intake stroke is low or even sub-atmospheric.

To properly locate the cylinder to take into account the factors above mentioned it has been the practice to build a base mount on the frame of the pumping unit. Such a mount is a welded framework at a suitable location as adjacent to the sampson post opposite to the well head. Once so mounted the cylinder operates properly and satisfactorily as long as the same pumping operation continues. However, the conditions in a well will not always remain the same. The amount of oil which can be pumped can vary and pressures in the well, primarily the gas pressure, can also vary. To accommodate these variations it is necessary to adjust the stroke of the walking beam for the oil and to adjust the position of the gas compressor pump in relation to the walking beam. The walking beam adjustment is effected by changing the throw of the drive motor crank. Such an adjustment changes the piston movement of the gas compressor cylinder, and it becomes necessary to relocate the cylinder with respect to the pumping unit frame and the walking beam. To do this, an operator will need to change and/or relocate the base mount. Cutting and welding torches will be necessary and this can be a major job.

THE INVENTION

The present invention was conceived and developed with the foregoing and other considerations in view, and the invention comprises, in essence, an adjustable base mount for supporting the cylinder on the pump frame. This mount is formed essentially as an upright, telescoping support capable of being raised and lowered to selectively position the cylinder. This simple expedient was found to be sufficient without the need for other adjustments and it was discovered that other adjustment parameters, such as changes in the rate of the piston strokes, would not be necessary. To use the adjustable base mount, the compressor cylinder can be initially located on the pump where the maximum movement of the walking beam at the piston connection is slightly less than the full stroke of the piston, and the subsequent adjustments to the compressor cylinder will be to place the cylinder such that the bottom of the piston stroke is adjacent the bottom of the cylinder to produce the desired pressure and to expel all compressed gas from the cylinder.

OBJECTS AND ADVANTAGES OF THE INVENTION

It follows that other objects of the invention are to provide a novel and improved adjustable base mount for a walking-beam gas compressor which; eliminates changes to the base mount structure whenever the rock of the walking beam and the stroke of the well pump are changed; may be adjusted quickly and easily; enhances efficient compression and pumping of gas from a well and is a neat-appearing, simple, economical, rugged, and durable unit.

With the foregoing and other objects in view of my invention comprises certain constructions, combinations and arrangements of parts and elements as herein-

GENERAL DESCRIPTION OF DRAWINGS

SPECIFIC DESCRIPTION OF THE DRAWINGS

Figure 1:
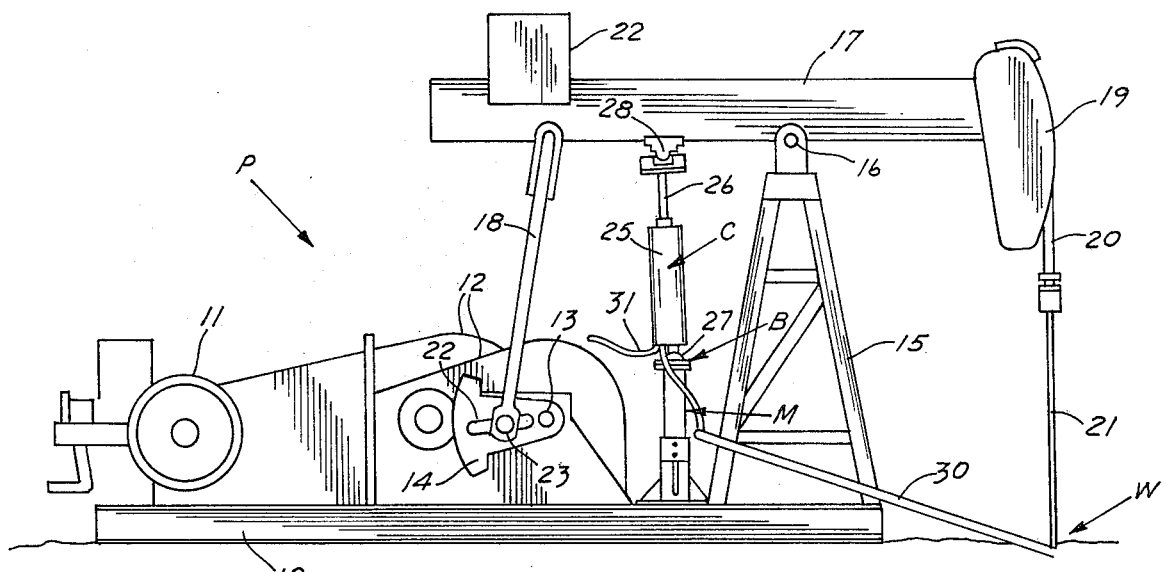
FIG. 1 is a side elevational view of a well pump showing a compressor cylinder mounted between the pump base frame and the walking beam and with the improved adjustable base mount supporting the cylinder.
Figure 2:
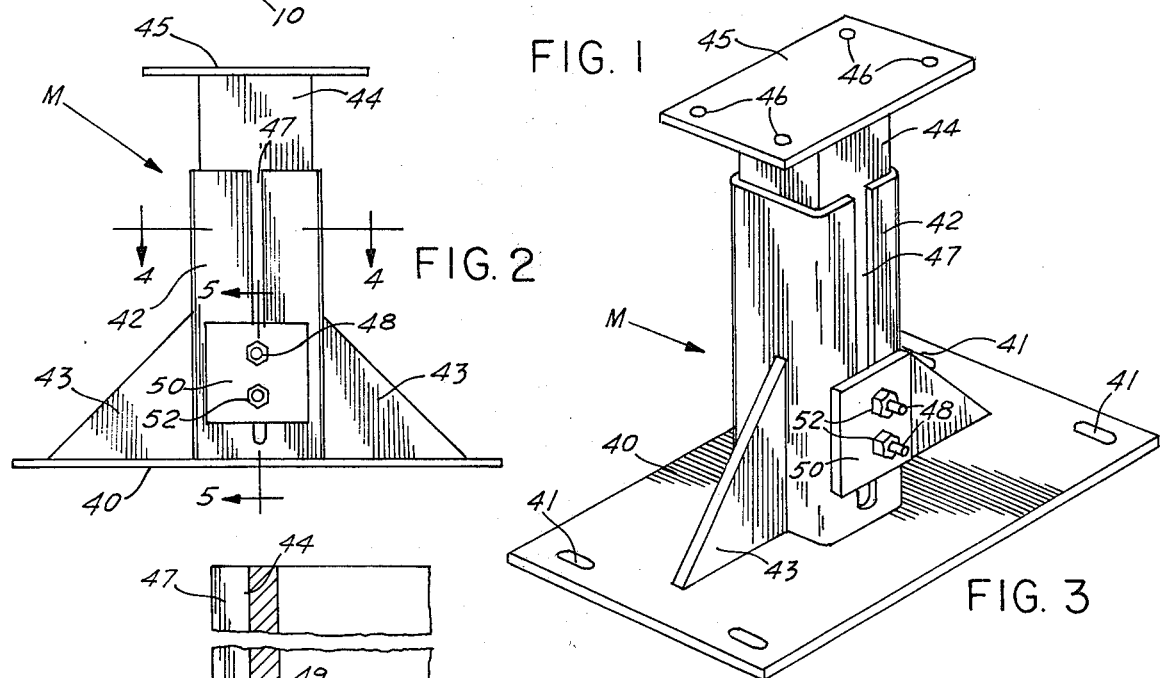
FIG. 2 is a front elevational view of the base mount per se.
Figure 3:
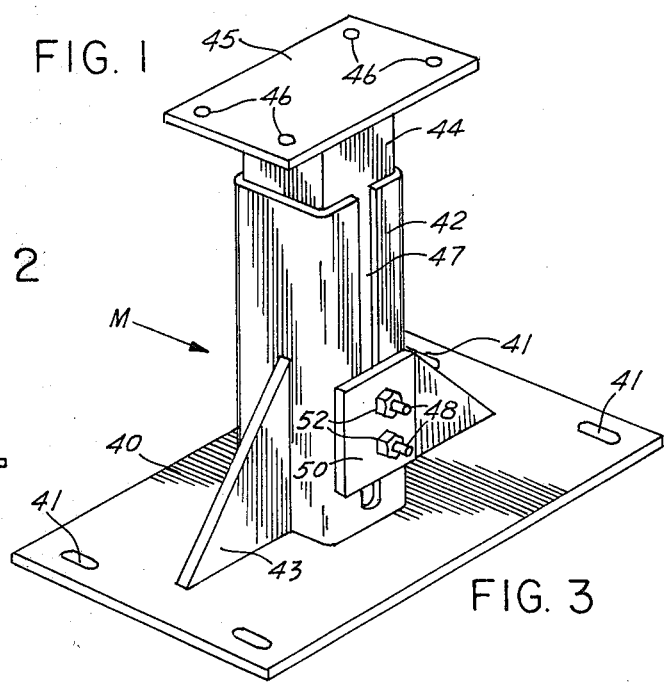
FIG. 3 is an isometric view of the beam mount per se.
Figure 5:
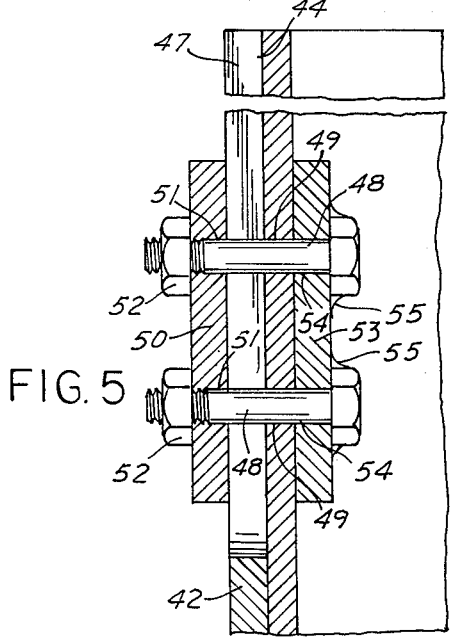
FIG. 5 is a fragmentary sectional view as taken from the indicated line 5—5 at FIG. 2 but on an enlarged scale.
Figure 4:
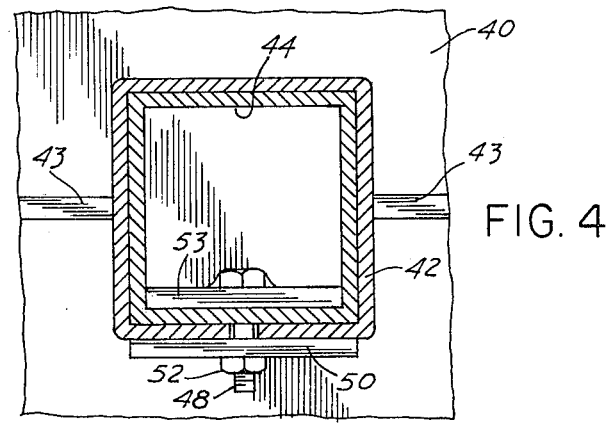
FIG. 4 is a fragmentary sectional plan view as taken from the indicated line 4—4 at FIG. 2 but on an enlarged scale.

Referring more particularly to the drawings, the pump unit P is mounted upon a base 10 formed of a platform mounted suitable longitudinal and transverse beam members. This base 10 is mounted horizontally upon a foundation or ground surface with one end of the frame being adjacent to a well head W. A motor 11 is mounted upon the opposite end of the base 10 and is connected with gearing within housings 12 which extend to a final drive shaft 13 near the center of the base. A crank and counterweight 14 is mounted on this shaft 13 to rotate in a vertical, longitudinal plane.

A sampson post 15 upstands from the well-head-end of the base 10 with a transverse saddle pivot 16 at its crown to carry a longitudinally disposed walking beam 17 which rocks, or oscillates, in a vertical plane. One end of this walking beam 17 overhangs the crank 14 and is connected thereto by a pitman 18. The other end of the walking beam carries a horse head 19. A bridle 20 mounted on this horse head is connected to a polished rod 21 extending into the well W, shown without the usual, well head fittings. A counterbalance 22 is mounted on the walking beam 17 to balance the weight of the pump rods in the well.

In operation, rotation of the crank 14 rocks the walking beam 17 to reciprocate the polished rod 21 and pump oil from the well. The rate at which oil can be pumped will depend upon the well capacity and the size of the pump in the well, the rate of pump reciprocation. The length of the pump stroke must be selected and balanced for any given well. As pumping continues, the capacity of the well can change and for this reason, or other reasons, changes in the basic set-up are required. For moderate adjustments, it is not practical to change the pump in the well. Nor it is desirable to change the rate of pump reciprocation, that is the speed of the motor 11. However, the pump stroke can be quickly and easily changed by changing the crank throw. For such adjustment purposes the crank 14 has a radial slot 22 wherein a pivot 23 is mounted to connect with the connecting rod 18. The pivot 23 includes suitable locking components, not shown, to affix it at any selected radial position in the slot 22. It is to be noted that other types of cranks, not shown, may have radially spaced holes wherein the pivot 23 fits.

If the gas is a product of the well, it may, also, be pumped from the well by the action of the walking beam 17. A compressor C, a cylinder 25 and a piston 26 will be mounted on the pump unit P between the base 10 and the walking beam 17. The cylinder 25 is pivotally supported upon a bearing 28 which is carried upon a base frame B and the piston 26 is pivotally connected to a bearing 28 at the underside of the walking beam. As shown at FIG. 1, the base frame B is attached to the adjustable base mount M as hereinafter further described. The adjustable base M is mounted directly on the pump platform 10 by bolts. When mounted in place, the piston 26 of the compressor can reciprocate the cylinder 25 as the walking beam rocks. The gas is pumped from the well head W as through an intake or suction line 30 to the cylinder 25 and thence through a discharge line 31 under high pressure and to a collection system, not shown. Suitable valves, also, not shown, may be included in these lines 30 and 31. To most effectively pump the compressed gas it is important that the cylinder 25 be positioned so that the downstroke, the compression stroke, of the piston 26 terminates at the optimum distance from the bottom of the cylinder to compress the gas to line pressure or above. Otherwise, the efficiency of the pump could be greatly reduced.

It is manifest that any change of the pumping stroke of the well, by changing the position of the pivot 23 in the slot 22 of crank 14, will require a change in the position of the cylinder 25. The improved base mount M permits this change to be quickly and easily made.

The adjustable base mount M, shown in detail at FIGS. 2 to 5, includes a base plate 40 having slotted corner holes 41 to facilitate affixing it to the pump base platform. A square-sectioned tubular standard 42 upstands from the center of this base plate 40, is welded thereto, and is reinforced by gusset plates 43 between the sides of the standard and the base plate. An adjusting post 44, a square-sectioned tubular member, is telescopically carried in the tubular standard with a snug, sliding fit. A carrier plate 45 is affixed to the top of this adjusting post 44 and is provided with suitable holes 46 for connection with the block of the cylinder bearing 27.

Once the base mount M is bolted to the platform 10 and the cylinder bearing 27 is mounted on the carrier plate 45, the cylinder 25 and the piston 26 are mounted in place as described. The adjusting post 44 is then slid in the standard 42 to a proper position for movement of the piston to the bottom of the cylinder when the walking beam is at its bottom position, with respect to the compressor C. The adjusting post is then locked in place. It is to be noted that the height of the 42 and the length of the adjusting post 44 is such that a full range of adjustments is possible, and each M is manufactured according to the size of the pumping unit P. M may have a 60"-42" and 44" or even longer.

A convenient, reliable and simple lock means is formed in this base mount M by an extended, centered slot 47 in one upright face of the standard 42. A pair of bolts 48 are snugly fitted in holes 49 in the lower portion of the adjusting post 44 in an alignment to permit the bolts to fit in the slot 47 and project therefrom. A grap plate 50 having holes 51 to receive the projected ends of the bolts 48 fits against the face of the standard 42 and is tightened against this face by nuts 52. To complete this organization, a reinforcing plate 53, having holes 54 to receive the bolts 48 is sized to fit into the tubular adjusting post 44 with the bolts 48 being extended through the reinforcing plate 53 and the side of the adjusting post 44. The heads of the bolts 48 are welded to this reinforcing plate as at 55 to prevent their turning when the nuts 52 are tightened as after adjusting the height of the mount to properly locate the cylinder 25. The two plates 50 and 53 are pressed together by the nut-bolts to provide a large bearing area between the inner tube and the outer tube providing a friction bearing surface capable of larger loads than the bolts and nuts alone. The nuts are pulled up to 650 foot-pound torque which will adequately accept compressive loads of over 12,000 pounds per square inch. The tubes, for one convenient size, are 12-18 inches high, which permits an elevation change of the top plate of some 2-8 inches or more adequate for all pumping units. Other sizes may be used to accommodate unusual height problem with the pump and the base.

I have now described my invention in considerable detail, however, it is obvious that others skilled in the art can easily change various parts within the spirit of the invention.

What is claimed is:

1. An adjustable base support for oil well piston pump subjected to high pressures and requiring periodic adjustment of height of the pump cylinder comprising:
   (a) a base plate for securing to a pumping platform,
   (b) an outer rectangular tube secured to and upstanding on said base plate, including bracing means for said tube on said base plate, and including a narrow slot in one side extending from adjacent said base plate to the distal edge of the tube forming an open slot,
   (c) an inner rectangular tube telescoped in said outer tube with a close fit and having an end extending a short distance beyond the end of said outer tube,
   (d) a pump support base secured to the extending end of said inner tube,
   (e) locking means for securing said inner and outer tubes in a predetermined telescoped position including a pair of bolts extending through bolt openings in said inner tube and through said slot and having the bolt heads internally of said inner tube, a pressure plate of substantially the width of the inner tube positioned between the bolt heads and the inner tube wall with the bolt heads welded thereto, and an outer pressure plate of substantially the width of the outer tube mounted on said bolts on the exterior of said out tube, and a nut threadly attached to each said bolt.

2. An adjustable base support for oil well piston pump subjected to high pressures and requiring periodic adjustment of height of the pump cylinder according to claim 1, wherein said tubes are arranged for about 2 to 8 inches of extension.

* * * * *